US005188809A

United States Patent [19]

Crocker et al.

[11] Patent Number: 5,188,809

[45] Date of Patent: Feb. 23, 1993

[54] METHOD FOR SEPARATING COKE FROM A FEED MIXTURE CONTAINING ZIRCONIUM AND RADIOACTIVE MATERIALS BY FLOTATION PROCESS

[75] Inventors: William A. Crocker, Salem; John C. Haygarth, Corvallis; Jon A. Riesen, Albany; John R. Peterson, Salem, all of Oreg.

[73] Assignee: Teledyne Industries, Inc., Albany, Oreg.

[21] Appl. No.: 575,817

[22] Filed: Aug. 31, 1990

Related U.S. Application Data

[63] Continuation-in-part of Ser. No. 558,464, Jul. 27, 1990, abandoned, which is a continuation of Ser. No. 318,162, Mar. 2, 1989, abandoned.

[51] Int. Cl.[5] .................... C01G 43/00; C01F 13/00; C01F 15/00

[52] U.S. Cl. .................... 423/2; 252/626; 423/461; 423/252; 423/253; 209/165; 241/20; 241/21

[58] Field of Search .................... 252/626; 241/20, 21; 209/165; 423/461, 2, 252, 253

[56] References Cited

U.S. PATENT DOCUMENTS

| | | | |
|---|---|---|---|
| 2,000,656 | 5/1935 | Armstrong et al. | 209/166 |
| 2,142,207 | 1/1939 | Price | 209/165 |
| 2,226,170 | 12/1940 | Lasseter | 209/165 |
| 2,697,518 | 12/1954 | Bennett et al. | 209/166 |
| 3,138,550 | 6/1964 | Woolery | 209/5 |
| 3,595,390 | 7/1971 | Booth | 209/166 |
| 3,656,938 | 4/1972 | Penzes | 209/166 |
| 3,794,250 | 2/1974 | Brewer | 241/21 |
| 3,910,836 | 10/1975 | Raby et al. | 209/166 |
| 4,268,485 | 5/1981 | Deneke et al. | 423/3 |
| 4,362,552 | 12/1982 | Petrovich | 75/2 |
| 4,454,097 | 6/1984 | Nirdosh et al. | 423/8 |
| 4,649,029 | 3/1987 | Nirdosh et al. | 423/8 |
| 5,051,165 | 9/1991 | Andrews | 209/166 |

FOREIGN PATENT DOCUMENTS

| | | |
|---|---|---|
| 1223373 | 6/1987 | Canada . |
| 50-11846 | 5/1975 | Japan . |

*Primary Examiner*—Donald P. Walsh
*Assistant Examiner*—Ngoclan T. Mai
*Attorney, Agent, or Firm*—Shoemaker & Mattare Ltd.

[57] ABSTRACT

A process for separating a feed mixture of zirconium and petroleum coke containing traces amount of radioactive materials by flotation process utilizing a plurality of flotation cells. The process comprises grinding the feed mixture, slurrying the ground feed mixture with water, treating the slurry with a flotation agent and a collector for the coke and subjecting the treated slurry to air sparging and agitation to create an overflow and an underflow. The overflow is then filtered to collect substantially zircon-free coke for further processing.

3 Claims, 4 Drawing Sheets

METHOD FOR SEPARATING COKE FROM A FEED MIXTURE CONTAINING ZIRCONIUM AND RADIOACTIVE MATERIALS BY FLOTATION PROCESS

This is a continuation-in-part of application Ser. No. 07/558,464, filed July 27, 1990, now abandoned, which is a continuation of application Ser. No. 07/318,162, filed Mar.2, 1989.

This invention concerns a leaching process for halogenated residues of ores, e.g., zirconium- and hafnium-containing ores, typically containing varying amounts of zirconium orthosilicate or zirconium dioxide but which typically also contain varying amounts, e.g., up to 10% by weight of hafnium as the orthosilicate or the oxide, and also small or trace amounts of elements and compounds including radionucleides and other undesirable substances. The invention also concerns the treatment of residues containing radionucleides and other undesirable substances in a highly efficient manner wherein such components are readily concentrated and isolated, if desired, for disposal or sale, or recycle, and for greatly reducing waste disposal problems and disposal costs.

In the processing of zirconium-containing ore to recover high purity zirconium it is conventional to mix coke with the comminuted zirconium-containing ore or sand and chlorinate the products thereof (carbo-chlorination), separate the crude $ZrCl_4$ containing hafnium from by-products such as CO and $SiCl_4$, complex the zirconium and hafnium with $NH_4CNS$, and extract from an acidic aqueous solution the hafnium complex from the zirconium complex with organic solvent such as methyl isobutyl ketone (MIBK). This technology is taught, for example, in U.S. Pat. Nos. 2,938,769; 2,952,513; 3,069,232; 3,006,719; and 4,202,862; and the references cited therein, the disclosures of all of said patents being incorporated herein by reference.

The zirconium containing ores typically contain small or trace amounts of radioactive materials, containing elements such as U, Ra and Th, and compounds thereof, and undesirable materials such as lead-containing compounds, which are carried through the process and eventually report in waste effluent sludge, settling ponds and the like. In the residue waste materials, the levels of radioactivity must by both state and federal regulations be maintained at very low levels. The other undesirable materials such as lead or lead-containing compounds, must not be leachable from the waste as determined by standard EPA tests.

Residues of the carbo-chlorination process are comprised of radionucleides and other undesirable components which render disposal very costly. These residues constitute unreacted reductant and/or zirconium-containing ore which are contaminated primarily with the non-volatile chlorides of the various metallic impurities which naturally occur in the ore, and include radionucleides such as Ra and Th and other undesirable components such as Pb.

While acid leaching has been used heretofore to extract radium values and other values from ores, the leaching of process residues and particularly chlorination-process residues in this regard and as described herein is novel.

A specific object, therefore, of the present invention is to provide a Zr/Hf recovery process by concentrating the radioactive or otherwise toxic materials derived from the processing ores such that they can be disposed of legally and safely in an economically acceptable manner.

A specific object is in a Zr/Hf recovery and purification process wherein the chlorination residue contains unreacted ore and coke, low level radioactive material and toxic lead containing material, to provide highly effective procedures for separating out unreacted ore, unreacted coke, and either mixed or separate Ra and Pb, and to convert them to non-leachable compounds of small mass relative to said ore and coke and to any leach, precipitation or other aqueous media.

It is a still further object of the present invention to provide a separation process as described herein which segregates undesirable waste and to prevent release to the environment.

BRIEF SUMMARY OF THE INVENTION

These and other objects hereinafter appearing have been attained in accordance with the present invention which is defined as a process for treating a solids-containing residue stream containing non-volatile components including reductant, unreacted ore and non-volatile metal salts. Such treatment is accomplished by leaching with an acidic aqueous system to solubilize said trace Ra, Pb and other elements while settling out said unreacted ore and reductant and contacting the resultant leach liquor first with a soluble barium compound and then with a soluble sulfate to co-precipitate the barium and trace radium ions as a sulfate, then increasing the pH to precipitate other metals as their hydroxides or other insoluble compounds.

In certain preferred embodiments:

1) the said unreacted ore, zircon sand, and reductant are recycled to said chlorinator; and
2) the said unreacted reductant from the leaching step is carbon coke which is separated by flotation from the unreacted zircon sand, and wherein said ore is then recycled to said chlorinator.

BRIEF DESCRIPTION OF THE DRAWINGS

The invention will be further understood from the following description and drawings wherein.

DETAILED DESCRIPTION OF THE PREFERRED EMBODIMENT

Figure 1:
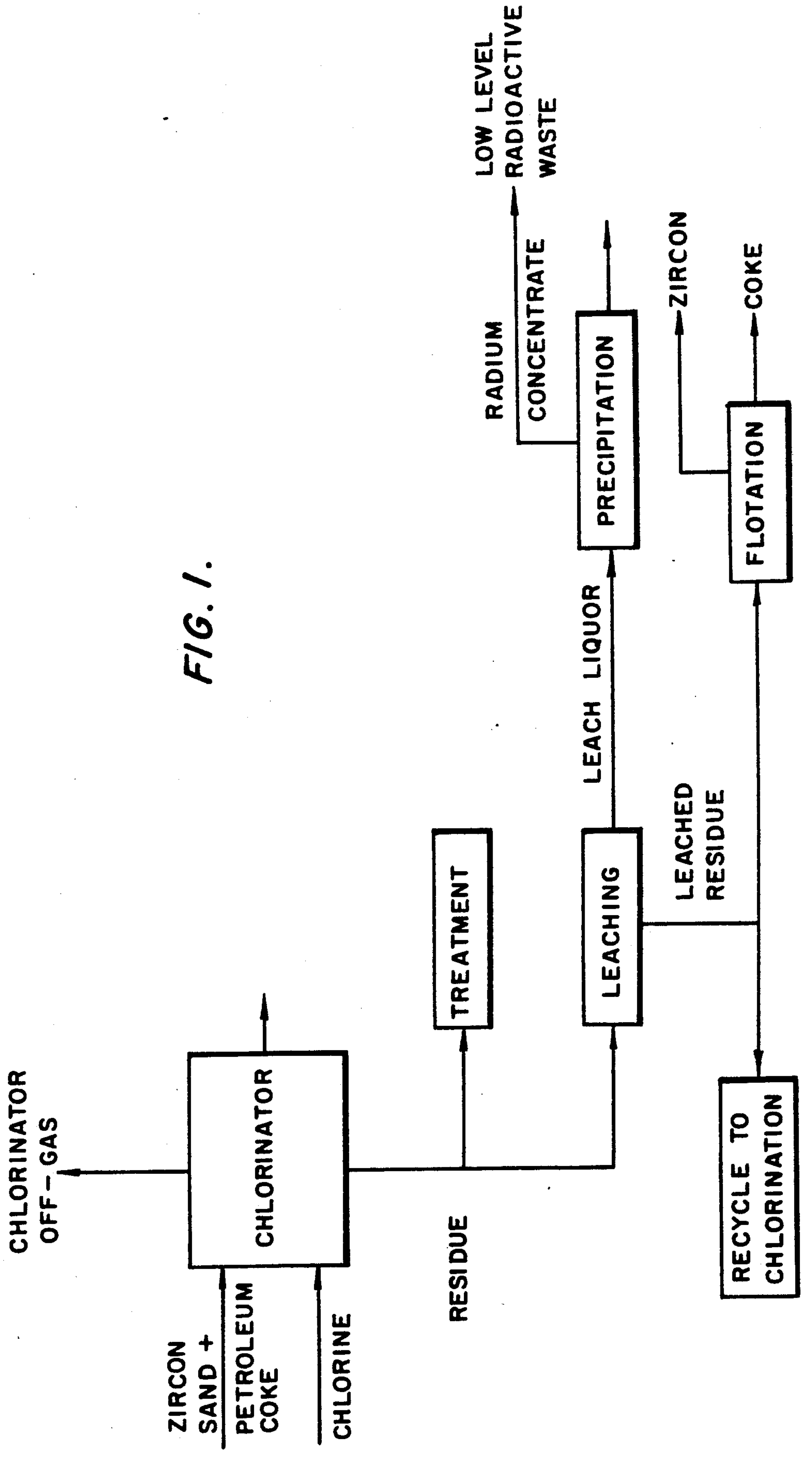
FIG. 1 is a block diagram of the chlorination and residue treatment and recovery of the present invention.

Referring now to FIG. 1, the chlorinator residue contains compounds, typically chlorides, of thorium, radium, lead, scandium, yttrium and some other rare earths such as from the lanthanide series, including the cerium subgroup (molecule weights 57–62) and the yttrium subgroup molecular weights 63–71. Chlorinator residue is quite bulky, and can be produced in relatively large quantities, so its disposal cost, which is charged on a volume basis, is quite high. In the residue treatment procedure, removal of the soluble radionucleides and other undesirable substances by leaching the otherwise untreated residue yields a product which is essentially a mixture of petroleum coke and zircon. It is possible to recycle this leached residue to the chlorinator, if however, such is not desirable, the zircon and petroleum coke may be separated by a flotation process, to produce a petroleum coke suitable for sale or landfill disposal, the zircon then being recyclable or disposable. Finally, the liquor resulting from leaching of the chlorinator residue is treated to precipitate and concentrate the radionucleides and other undesirable substances, and this concentrate is rendered into a form suitable for final disposal by insolubilization of the toxic materials, e.g., lead.

Figure 2:
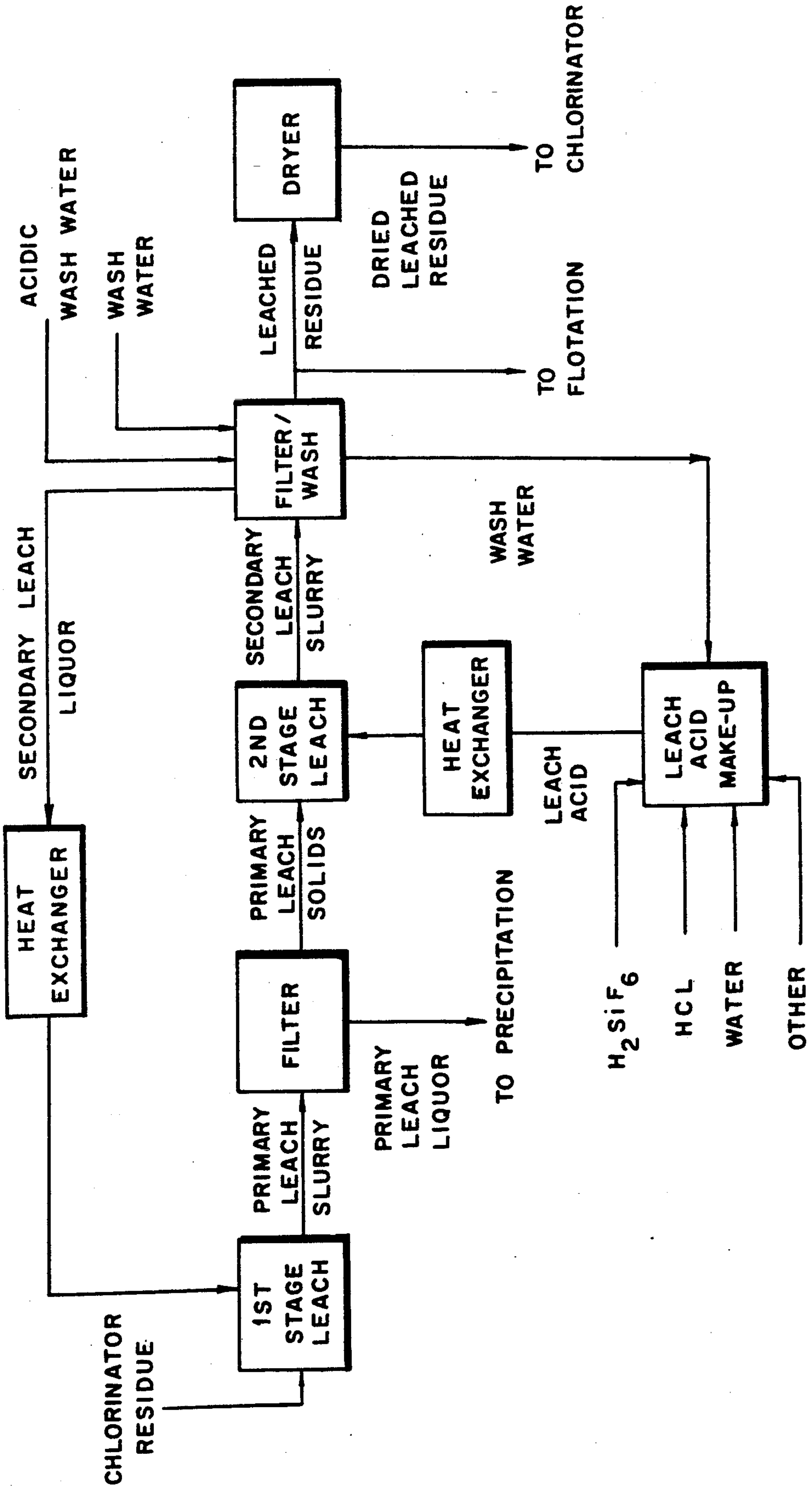
FIG. 2 is a schematic diagram of the LEACHING operation.

Referring to the LEACHING block of FIG. 1, and the flow diagram of FIG. 2, where it is desirable to greatly reduce the volume and weight of the waste to be disposed, this process finds exceptional utility. It is designed to remove metallic chlorides including radionucleides and other undesirable substances from a waste stream to provide a recyclable or disposable product. It is particularly addressed to the removal of metal chlorides from the unreacted constituents of chlorinator residue (e.g., zircon sand and petroleum coke). It has been found that water leaching is not sufficient to produce recyclable products from all chlorinator residues. Specific objects of this procedure include reducing the amount of waste material which must be disposed of as a low-level radioactive waste, thereby reducing the disposal cost. It is also an objective to beneficiate the chlorinator residue by removal of the metal chlorides in order to recycle the unreacted components back to the chlorinator, e.g. zircon sand and petroleum coke; to recover other components from the residue, e.g. scandium, yttrium and rare earths; and to provide a chloride-free feed material to the process for the separation of sand and coke. Where indicated, alkali used in the novel processes herein, are used to precipitate toxic metals such as lead and the like and not to precipitate previously unprecipitated radium.

These objects are attained by this procedure through the removal of metal chlorides from sand chlorinator residue by acid leaching the residue followed by washing and drying. The process of the present invention of leaching process residues, particularly chlorination process residues, represents novel and vastly improved process over the prior practice of leaching chlorinator residue and provides for a higher degree, e.g. greater than 95% of metal chloride removal, which facilitates economical recycle to chlorination. Additionally, the substantial removal of the radium and the thorium, reduces the radiological hazards involved with handling the leached residue during recycle.

As will be shown hereafter, the addition of small quantities of fluosilicic acid, $H_2SiF_6$, to the leach liquor is a novel process to facilitate the leaching of thorium.

In a preferred embodiment of this procedure, chlorinator residue is treated in the unit operations shown in the process flow diagram of FIG. 2. Vessel dimensions, flow rates, chemical concentrations and operating temperatures are described hereinafter. The leaching operation is designed to solubilize essentially all metal chlorides. The optimum solution for the leaching operation was 2 normal with respect to hydrochloric acid and 0.01 normal with respect to fluosilicic acid. The addition of fluosilicic acid facilitated removal of thorium. The preferred temperature is about 80 degrees C., and the optimum hold-up time is about 2 hours per stage. Two stages of countercurrent leaching are satisfactory for removal of metal chlorides. The optimum solids to liquids ratio is one gram of chlorinator residue for two milliliters of leach acid.

The described leaching conditions were derived from considerable laboratory experimentation which produced the conditions and discovery of processes for achieving greater than 95% leaching efficiency of metal chlorides while remaining economical relative to alternative leaching methods. The use of more exotic leaching methods such as pressure leaching will also produce the desired result.

Nitric acid is an acceptable alternative to hydrochloric acid for providing an equivalent extraction of metal chlorides from the chlorinator residue. However, nitric acid is more expensive and represents a disposal problem and therefore is not preferred. Additionally, other acids and combinations of acids could provide the desired extractions.

Additional stages of countercurrent leaching would result in equal or greater extraction of metal chlorides. Such would not be preferred due to the added process time and equipment requirements, when two stages are adequate.

Other acceptable ranges for this process are as follows:

- Leach acid concentrations ranging up to 12 normal HCL;
- Leach time per stage ranging up to 24 hours;
- Solids to leach acid ratios from 1 gram/milliliter to 1 gram/10 milliliters or more; and
- Leach acid temperatures preferably range from ambient to about 100 degrees C. at atmospheric pressure.

The preferred embodiment includes filtration after each stage of leaching. First stage solid-liquid separation is preferably accomplished by filtration. The filtrate is routed to another area for treatment. The solids are transferred to the second stage leach tank for processing. The solids from second stage leach filtration must be thoroughly washed. Preferably this can be accomplished in the same equipment. The wash water used on the second stage leached solids is applied in four stages of washing. This was determined experimentally to be the optimum number of stages. The amount of wash liquor used in each stage is about one milliliter for each two grams of residue fed to the process. In the first two stages of washing, the wash water must be acidified to a pH of 1 or less. The third and fourth stages use water to remove residual chlorides.

The wash liquors are collected separately from the second stage leach filtrate and used for leach acid makeup. The second stage leach filtrate is routed to a heat exchanger where its temperature is brought up to about 80 degrees C. From there the liquor is sent to the first stage leach tank. This represents a typical countercurrent operation.

The leached solids can optionally be transferred to the drying operation where the moisture content is reduced. The dried leached chlorinator residue would then be ready for recycle to chlorination or subsequent treatment or disposal.

The utility of the present process would extend to any or all residues containing soluble radionucleides and/or other undesirable substances, the extraction of which from the residue may be desirable.

EXAMPLE I

This Example I and the following Example II describes how the processes of the present invention precipitate radium as radium-barium sulfate and how a pH adjusted leach liquor, initially containing 720,000 pCi/l radium is treated in a single step to produce a liquor containing less than about 10 pCi/1 and preferably less than about 9 pCi/1 radium effectively and efficiently meeting a stringent Federal Water-Discharge Standard.

A 500 gram sample of the residue from the carbochlorination of zircon sand was obtained from a chlorinator. The residue was added to a two liter Erlenmeyer flask containing 1000 milliliters of leach acid. The acid was made up to be two normal with respect to hydrochloric acid and 0.01 normal with respect to fluosilicic acid. The leach slurry was agitated for two hours at 80 degrees C. and the leach slurry then filtered on a Buchner vacuum filter. The filtered solids were then added to a second flask containing fresh leach acid which had been preheated to 80 degrees C. The residue was again leached for two more hours at 80 degrees C. The slurry was filtered on a Buchner vacuum filter. The solids remaining on the filter were washed twice with 250 milliliters of one-normal hydrochloric acid at 60 degrees C. The solids were then washed twice more with 250 milliliters of water. The solids were then removed from the filter and dried in an oven overnight at 100 degrees C. The dried solids were submitted for analysis which showed that 96.9% of the metal chlorides had been removed by the leaching procedure.

The leach liquor from the above described LEACHING procedure is routed as shown in FIG. 1 to the PRECIPITATION block which will be explained in detail hereinafter. Of principle concern to this treatment method is the precipitation and separation of radium from solution. Removal of radium from solution has been studied and practiced for years and includes but is not limited to the following techniques: barium sulfate co-precipitation; lime soda softening; ion exchange; reverse osmosis; selective membrane mineral extraction; and extraction by manganese impregnated acrylic fibers. The maximum dissolved radium that these processes will successfully treat to meet drinking water limits is reported to be 1500 pCi/1 (Trace Metal Data Institute, 1981). It was reported by Reid (Reid et al, 1985) that Kerr-McGee had experimentally treated radium solutions as high as 60,000 pCi/1 with a Ba precipitation process. No literature was found on precipitating solutions greater than 60,000 pCi/1. The reference publications are:

Reid, G. W., Lassovszky, P., Hathaway, S., "Treatment, Waste Management and Cost for Removal of Radioactivity from Drinking Water", Health Physics, Vol. 48, No. 5, 1985, and Trace Metal Data Institute, "Bulletin 607: The current status of radium removal technology", 1981.

The objective of this aspect of the overall process is to precipitate radium from solution to allow safe discharge of the solution to the environment. Radium must be separated from the liquors to the level required by environmental laws and regulations before discharge to the environment can take place.

One of the unobvious features of this invention lies in the successful treatment of levels of radium which are higher than those previously noted in the literature (60,000 pCi/1). The removal of radium from a solution to less than 50 pCi/1 and even less than 10 pCi/1 in a single stage precipitation and filtration or other means of separation and in any event reaching these levels with no more than two stages of precipitation and filtration is unexpected. The treatment of solutions with hundreds of thousands and even into the millions of pCi/1 of radium are possible by this procedure.

Figure 4:
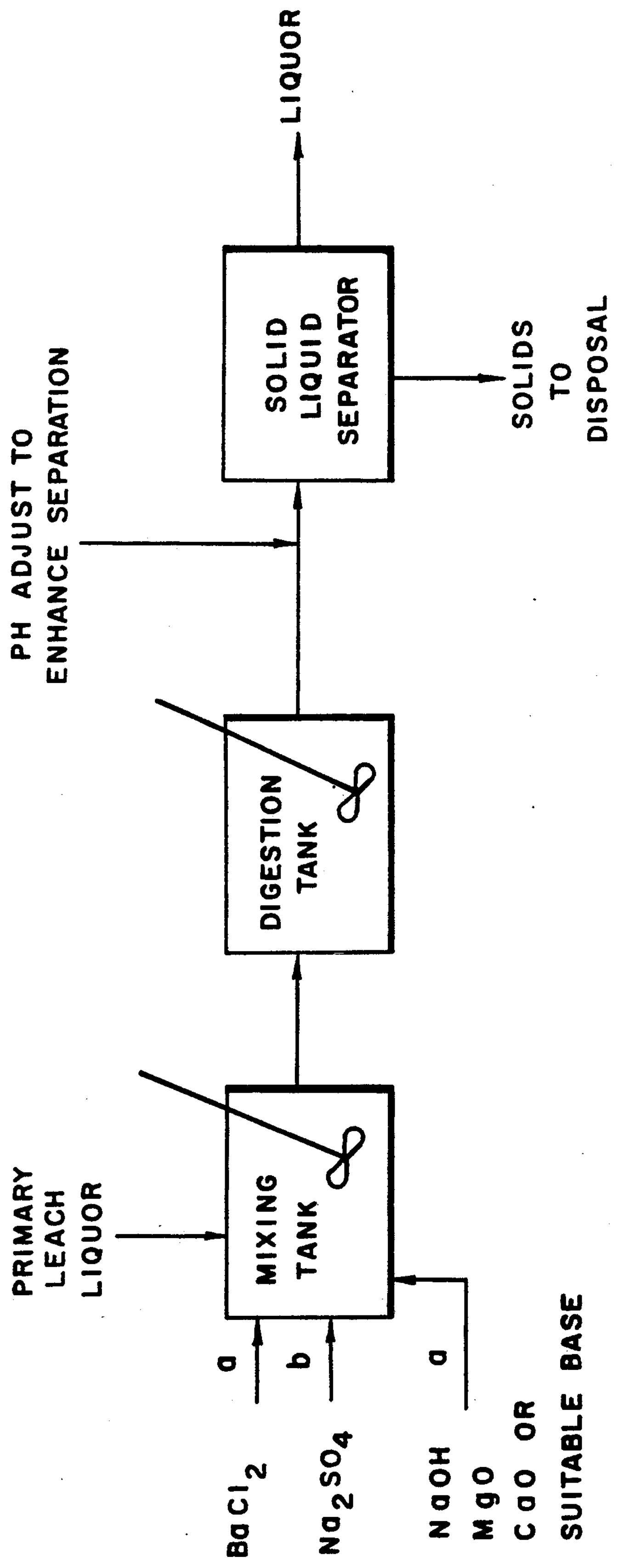
FIG. 4 is a schematic diagram of the PRECIPITATION operation.

In carrying out this procedure, the solution containing the radium is treated as shown in FIG. 4 and described hereinafter.

a) $BaCl_2$ is added at several fold to hundreds or even thousands fold the concentration of the radium, and allowed to dissolve. The temperature of the liquor may range from hot to cold and the pH from less than 1 to 14 with the preferred pH in the range of 2 to 7. If the pH is not in the preferred range, acids or bases should be used to reach this range. Such acids and bases can include essentially any compounds for which the net effect is to alter the pH of a system or solution, but it should be noted that particular extensive use of calcium compounds, e.g., $CaCO_3$, $Ca(OH)_2$, and the like, diminishes the efficiency of radium removal.

b) Sodium sulfate or any other source of soluble sulfate is then added in excess of the concentration of the barium plus radium ion equivalents and any other cations which might combine with the sulfate ions, i.e. calcium, rare earths, or the like. If the solution is cold, it should be heated and a digestion allowed to take place which can range from a fairly short time up to hours or days. The preferred digestion period would be a few hours with agitation in most cases.

c) Upon completion of the digestion, the solution is cooled and separated from the precipitates by the use of any of a number of solid-liquid separation techniques. A pH adjustment before separation may enhance the separation process and should be considered in each system where this invention is applied.

This procedure allows the precipitation of radium ions from a liquid stream, and the safe discharge of the treated liquid. It also allows for concentrating of radioactive waste by precipitating the radioactive components from the leach liquors that have been used to remove radium from radioactive waste.

EXAMPLE II

A 2-normal acidic solution containing 720,000 pCi/1 of radium was treated as follows:

One and one half liters of solution was first heated to 90 degrees C. and the pH thereof adjusted to 4.0 using MgO to neutralize the acid. After the dissolution of the MgO was complete, 48.75 g of $BaCl_2 \cdot 2H_2O$ was added and stirred for five minutes. At this point, 225 g of $Na_2SO_4$ was added a little at a time. Precipitation and flocculation were evident as soon as the $Na_2SO_4$ was added. The solution was then allowed to digest for two hours at temperature while being stirred, and then cooled over night without stirring.

Separation of the solids from the solution was accomplished by a 0.47 micrometer Millipore filter type HA. The radium level was less than 9 pCi/1 after this single-stage treatment.

Referring to the FLOTATION block, (FIG. 1, detail shown in FIG. 3) the object of this procedure is to separate an intimate mixture of finely-divided zircon and finely-divided petroleum coke to achieve a petroleum coke product containing less than one percent by weight zircon and a zircon product containing less than five, preferable less than one weight percent petroleum coke. This separation simplifies the disposal of the coke or sale of the coke to a subsequent user, and also facilitates recycle or disposal of the zircon. In this regard it is known that materials containing radionucleides present disposal difficulties, even if the radioactivity is low-level and the radionucleides are in an non-leachable form, as are the radium, uranium and thorium in zircon which are bound up in the zircon crystals. Leached residue from carbo-chlorination of zircon contains radium typically at levels of about 30 pCi/gm $Ra^{226}$, and even though more than 75% of this $Ra^{226}$ is contained in the zircon crystals, and thus non-leachable, disposal of leached residue in a landfill is precluded, discouraged or undesirable, leaving only more expensive disposal options. Moreover, the presence of zircon in petroleum coke ordinarily precludes its use as a feed for other processes, for example, the smelting of various metal ores or as a fuel additive. The petroleum coke typically constitutes 80%-90% of the weight of the leached residue, or 96% to 98% of the volume of the leached residue, so that freeing it from zircon, so that it can be disposed of cheaply, constitutes a considerable saving over disposing of it in a more expensive facility for materials containing low-level radioactivity. The possibility that the coke may be sold as feed for other processes is even more attractive. In the present process, the zircon fraction, being recovered essentially free of coke, constitutes typically only 2%-4% of the volume of the original leached residue, and the cost of disposing of this in a special site is much less than the cost of disposal of the whole of the residue. Further, under some circumstances, the zircon may be suitable for recycle as feed to carbo-chlorination processes.

Figure 3:
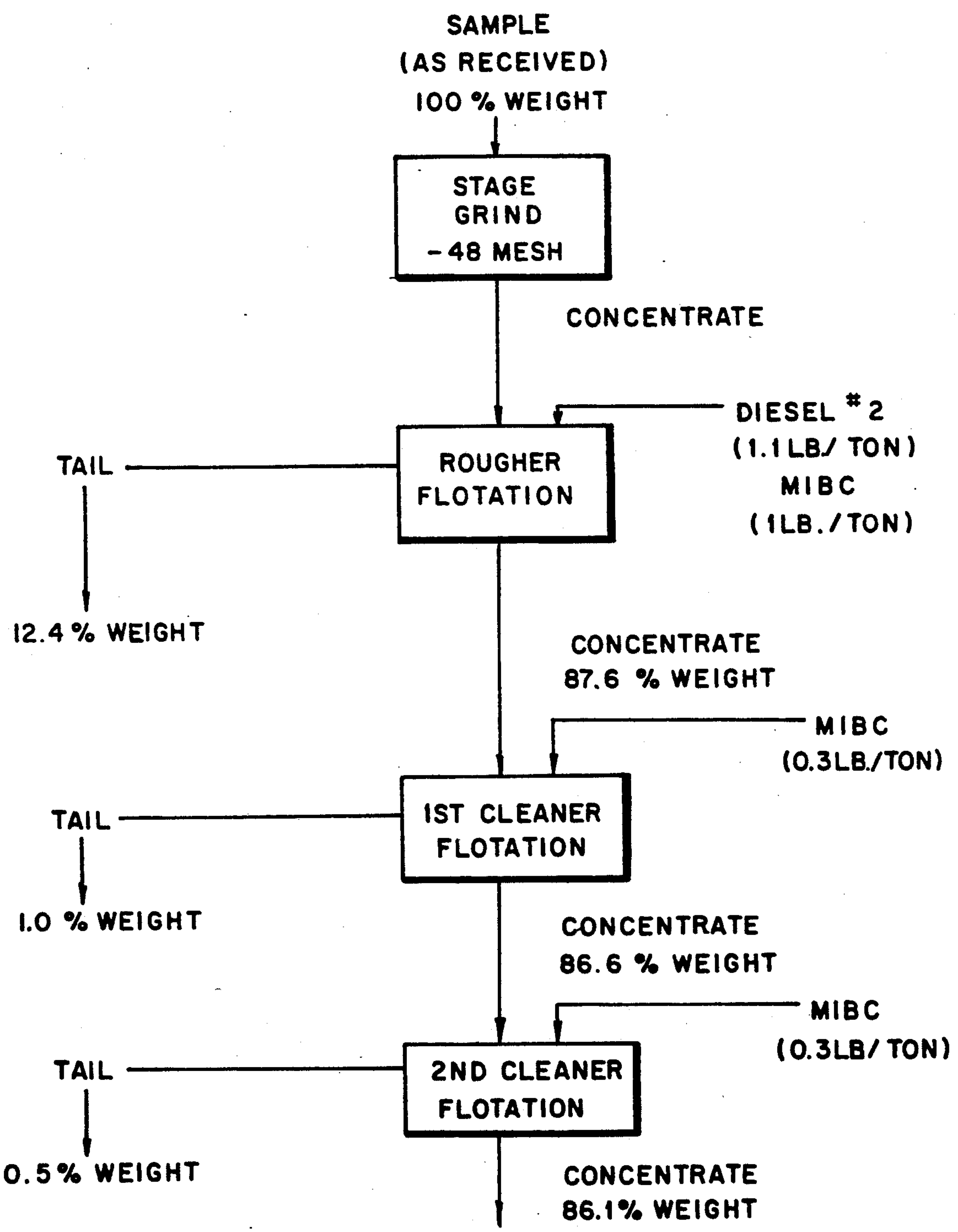
FIG. 3 is a schematic diagram of the FLOTATION operation shown.

This separation procedure for which a typical apparatus with descriptive legends is shown in FIG. 3, uses the froth-flotation process wherein the feed, a mixture of carbon and zircon containing usually 5 to 30 percent zircon by weight, but actually in any proportions from less than 1% zircon to over 99% zircon by weight, is ground to pass a 48-mesh screen, slurried with water and treated with, for example, diesel oil or any other suitable flotation-agent for the coke, and methyl isobutyl carbinol or any other suitable collector. The slurry is agitated and sparged with air, and the underflow removed as a slurry of essentially coke-free zircon. The overflow goes to a second agitated, air sparged cell, whence the underflow is added to the feed of the first cell, and the overflow goes to a third agitated air-sparged cell. The underflow from the third cell goes to the feed of the second cell and the overflow goes to a filter which collects essentially zircon-free coke which may be sent for disposal as wet-cake if it contains no standing liquid, or which may be dried for sale to a subsequent user.

EXAMPLE III

A sample of leached residue was gently ground to delump it and to permit it to pass a 48-mesh screen. It was then agitated with water and treated with No. 2 diesel oil at a dose-rate of 1.1 lb of oil per ton of leached residue, and with methyl isobutyl carbinol at a dose rate of 1 lb per ton of leached residue, and frothing commenced by air sparging for the first stage of the flotation. The tail from this operation comprised 12.0 weight percent of the sample and was essentially pure zircon, free of coke. The frothed material overflowed to the second stage of flotation where further methyl isobutyl carbinol was added, at a rate of 0.3 lb per ton of sample. The tail from this stage was 1.0 percent of the initial weight of the sample. The frothed material overflowed to a third stage of flotation where a material addition of methyl isobutyl carbinol was made at the same rate. This produced a tail amounting to 0.5 weight percent of the initial sample weight and a floated product which on drying comprised 86.1 weight percent of the original sample, and which had an ash weight of 1.1%. Subsequent analysis showed this material to be 0.65 weight percent zircon, and to have a radium content of 3.2 pCi/gm, that is less than about 5.0 pCi/gm.

In regard to the RECYCLE block shown in FIG. 1, this procedure involves the recycle of the leached zircon sand/petroleum coke mixtures for reprocessing in the fluidized-bed chlorinator. It is particularly noted that even though chlorinator residues have been thoroughly leached and washed to remove salt impurities and soluble radionucleides, and are thoroughly dried, the problem remains of how to combine this material with the appropriate amount of milled zircon to obtain a feed mix suitable for efficient fluidized-bed chlorination. In accordance with the present recycle procedure, the recycle mixture which is already of sufficiently small particle size is combined with the appropriate quantity of milled zircon (50% -325 mesh) to give a chlorinator feed mix containing approximately 80% zircon and 20% coke by weight, which is suitable for rechlorination. The feed is processed under normal chlorinator operating conditions, with roughly one pound of residue obtained for every 14–21 pounds of feed introduced. Therefore, for every 3.33 to 5 pounds of original residue after leaching, one pound of final residue remains after single-stage rechlorination, a reduction of 70–80%.

In order to place the treated residue recycle in proper perspective the following general and specific comments are given. In the carbo-chlorination of zircon, chlorine serves as the fluidizing and reacting gas in the chlorinator, which is operated at about 1050 degrees C. and slightly above atmospheric pressure. Zirconium tetrachloride, hafnium tetrachloride, and silicon tetrachloride vapors leave the chlorinator and are selectively condensed. Other chlorides, such as yttrium, thorium, and calcium, are produced in trace amounts and exist as liquids in the hot fluidized bed. These liquid chlorides accumulate in the bed, inhibiting fluidization and eventually causing a significant decrease in reactor efficiency, which results in lower chlorine utilization and reduced zirconium tetrachloride production. These conditions require the chlorinator to be shut down, and removal of the zircon/coke residue contaminated with chloride salts. Typically, one pound of residue is generated for every 20 pounds of feed mix chlorinated.

For every 100 pounds of original residue containing ten pounds of chloride salts, approximately 90 pounds remain after leaching, washing, and drying, of which 75 pounds is nominally coke and 15 pounds is zircon. In order to obtain a feed mix having the desired 80/20 weight ratio of zircon and coke, 285 pounds of milled zircon are blended with the 90 pounds of leached residue to give 375 pounds of feed mix. After chlorination, roughly 18–27 pounds of final residue, equivalent to 5–7% of the feed mix, remain. Therefore, rechlorination substantially reduces the quantity of residue requiring disposal from 90 to 18–27 pounds, or by 70–80%. This reduction in the quantity of residue can be highly variable, depending on the extent of leaching and chlorination employed.

This procedure allows for the recycle of a waste material (leached chlorinator residue) which otherwise would require expensive disposal. Even though the salt impurities and soluble radionucleides are removed by leaching, the remaining zircon contains enough naturally-occurring radionucleides to render the material a low-level radioactive waste. Therefore, recycle by rechlorination significantly reduces the disposal costs and at the same time produces zirconium, hafnium, and silicon tetrachlorides. This is all accomplished using existing chlorination equipment. The invention is also applicable to the residues generated from the high-temperature fluidized-bed chlorination of a variety of oxides including $ZrO_2$, $HfO_2$ and $TiO_2$, minerals (baddeleyite, rutile, etc.), and other related materials.

EXAMPLE IV

A fluidized-bed chlorinator test unit was constructed in the laboratory, consisting primarily of a chlorination reactor, disengagement section, condensers, and chlorine and nitrogen metering equipment. The reactor was comprised of a 2"-ID by 24-inch high opaque quartz tube with porous graphite distributor, encased in electric-resistance clamshell furnace heaters. A 4"-ID nickel disengagement section was placed above the reactor and densely-wrapped with beaded nichrome wire elements. A filter was installed between the disengagement section and condensers to retain fine solids in the chlorinator.

Zirconium and hafnium tetrachloride vapors were condensed in two barn condensers, equipped with external cooling-water jackets. The remaining off-gases, containing primarily chlorine, carbon monoxide, carbon dioxide, phosgene, silicon tetrachloride, and nitrogen purge gas, were treated in a caustic scrubber. Samples of off-gas were also collected and analyzed by gas chromatography.

Chlorine and nitrogen gases were carefully metered into the system, utilizing rotameters and a network of nickel tubing and valves. Controlling and indicating thermocouples were used together with analog controllers to maintain the desired temperatures for each piece of equipment. All heated surfaces were insulated with 1" silica glass-fiber blanket, held in place with glass-wool tape.

Initially, 1515 grams of leached residue, containing 17.8% zircon sand and 82.2% petroleum coke by weight, were blended with 4485 grams of milled virgin zircon to yield 6000 grams of feed mix containing 79.2% zircon and 20.8% coke. This material was successively chlorinated batchwise in 400-500 gram increments in the 2"-ID laboratory fluidized-bed reactor. The reaction temperature was 1050 degrees C., and the chlorine flow-rate was 3.0 liters per minute measured at room temperature. The zirconium and hafnium tetrachlorides produced were condensed at 50-60 degrees C., and no effort was made to recover the silicon tetrachloride.

Twelve separate two-hour batch experiments were performed, reducing 5600 grams of feed mix (400 grams were set aside for chemical analysis) to a final weight of 407 grams pulled from the chlorinator. For each run, the bed was brought up to temperature while being fluidized with inert nitrogen gas. Once operating conditions were established, chlorine was introduced as the fluidizing gas, as the nitrogen was shut off. After each run, enough feed mix was charged to the reactor to replace that which had been chlorinated away.

Overall, 5121 grams of crude zirconium tetrachloride product was collected, corresponding to a yield of 91%. Since the amount of final residue remaining was 407 grams and the initial residue before rechlorination was (1515)(5600/6000)=1414 grams, a 71% reduction was achieved. This percentage could have been increased by extending the run time of the last experiment.

EXAMPLE V

In order to demonstrate the degree of effectiveness in removing the trace amounts of radioactive element Th in sufficient quantity to permit either diposal or recycling of the leached residue, suitable samples of residue as described in Example I were leached with fluosilicic acid in varying amounts W/V and without any fluosilicic acid. To a first series of samples, fluosilicic acid was added in various amounts ranging from about 1% to about 3% of the acid. To a second series of samples, no fluosilicic acid was added. A third series had added about 0.01% fluosilicic acid.

The results showed that (1) without fluosilicic acid, leaching removed only about 50% to about 70% Th. The samples to which 0.01% acid was added showed a reduction and removal of from about not less than 90% Thorium.

Those samples to which more than 1% fluosilicic acid was added exhibited an opposite effect in that the Thorium became completely insoluble in the acid and could not be leached.

EXAMPLE VI

While it is known that almost all other systems for the precipitation of Ra use CaO (Quick lime) or $CaCo_3$ (Limestone) as the base and neutralizer for pH adjustment, the present process provides unexpected and significant results in reducing the radium level in a single precipitation in the order of magnitude of about 105 times.

The prior art systems commonly employ precipitation processes which add $BaCl_2$ in large excess relative to the radium (approximately 1000 to about 100,000 times). Sulfate ions ($SO_4=$) are then added, usually as $Na_2SO_4$ to form the (Ra, Ba)$SO_4$ precipitate. If there is any calcium in the system, it will form an insoluble precipitate as well as competing with the Ra and Ba for the $So_4=$ions.

To two suitable samples of leach liquor, obtained as previously described, NaOH and $Mg(OH)_2$ were used to adjust the pH and the results contrasted with a third sample using $Ca(OH)_2$. In the former samples, $Na_2SO_4$ and $Mg_2SO_4$ were formed respectively when the $(Ra_x Ba_y)SO_4$ reaction was completed (where $Y>>X$). These substances were very soluble and did not diminish or compete for $SO_4=$ion. Where lime was used as a base on the third sample, only about 100 pCi/1 radium levels was reached.

In additional tests involving the first two samples, whose pH was adjusted prior to precipitation of Ra in $BaSO_4$, a single stage precipitation provided test results of 9 pCi/1 as compared to 720,000 pCi/1, a reduction in the order of magnitude of $10^5$ times far better than conventional precipitation using quicklime or limestone.

The invention has been described in detail with particular reference to preferred embodiments thereof, but it will be understood that variations and modifications will be effected within the spirit and scope of the invention.

We claim:

1. In a process of separating a feed mixture of zircon, coke and trace amounts of radioactive materials employing a plurality of flotation cells the improvement which comprises the steps of:

a) grinding said feed mixture;

b) slurring said ground feed mixture with water;

c) treating said slurry with a flotation agent and a collector for the coke;

d) in a first cell, agitating the slurry and sparging said agitated slurry with air and providing a first underflow and a first overflow in said first cell;

e) removing the first underflow of said slurry substantially free of coke;

f) removing the first overflow to a second cell, agitating and air sparging said overflow, wherein a second underflow is created and added to the feed of the first cell and a second overflow is created g) removing the second overflow to a third cell, agitating and air sparging said second overflow creating a third underflow and overflow, which overflow is filtered to collect substantially zircon-free coke for further processing and whose underflow is added to the feed of the second cell; and h) removing radioactive materials including Ra, U, and Th where Ra is present in the coke after flotation at less than about 5.0 pCi/gm.

2. The process of claim 1 wherein the feed mixture is ground to a size sufficient to pass about a 48 mesh screen.

3. The process of claim 1 wherein the substantially zircon-free coke is recovered as a floated product having less than about 90% weight percent of the original feed mixture and having a radium content of less than about 5.0 pCi/gm.

* * * * *